(12) United States Patent
Leip et al.

(10) Patent No.: US 12,146,545 B2
(45) Date of Patent: Nov. 19, 2024

(54) DAMPER SYSTEM AND ACOUSTIC BUSHING FOR A VEHICLE

(71) Applicant: Sumitomo Riko Company Limited, Aichi (JP)

(72) Inventors: Dennis Leip, Gelnhausen (DE); Sebastian Bös, Brachttal (DE)

(73) Assignee: Sumitomo Riko Company Limited, Aichi (JP)

( * ) Notice: Subject to any disclaimer, the term of this patent is extended or adjusted under 35 U.S.C. 154(b) by 90 days.

(21) Appl. No.: 18/134,812

(22) Filed: Apr. 14, 2023

(65) Prior Publication Data

US 2023/0340950 A1    Oct. 26, 2023

(30) Foreign Application Priority Data

Apr. 21, 2022   (DE) .......................... 102022109642.4

(51) Int. Cl.
*F16F 15/04*     (2006.01)
*F16F 15/08*     (2006.01)
*F04B 39/00*     (2006.01)

(52) U.S. Cl.
CPC .............. *F16F 15/04* (2013.01); *F16F 15/08* (2013.01); *F04B 39/0044* (2013.01)

(58) Field of Classification Search
CPC .......... F16F 15/04; F16F 15/08; F16F 1/3863; F16F 15/046; F04B 39/0044

USPC .......................................................... 248/638
See application file for complete search history.

(56) References Cited

U.S. PATENT DOCUMENTS

| 11,773,942 | B2* | 10/2023 | Kondor | F16F 13/1481 |
| | | | | 267/140.13 |
| 2022/0225020 | A1* | 7/2022 | Misulia | H04R 3/005 |
| 2024/0190234 | A1* | 6/2024 | Nishimaru | F16F 15/08 |
| 2024/0286680 | A1* | 8/2024 | Leip | B62D 21/11 |

FOREIGN PATENT DOCUMENTS

| DE | 19631893 A1 | 2/1998 |
| DE | 19802881 B4 | 2/2009 |
| DE | 102019115263 A1 | 12/2020 |

OTHER PUBLICATIONS

German Patent Office Examination Report with abstracts dated Jan. 6, 2023 for German Patent Application No. 102022109642.4.

* cited by examiner

*Primary Examiner* — Todd M Epps
(74) *Attorney, Agent, or Firm* — McCarter & English, LLP (57) ABSTRACT

A damper system for damping vibrations of an assembly unit of a vehicle comprises one or more main vibration dampers and one or more acoustic bushings. The respective main vibration damper is tuned to vibrations from a lower frequency range. The respective acoustic bushing is tuned to vibrations from a higher frequency range which lies above and does not overlap with the lower frequency range.

25 Claims, 6 Drawing Sheets

DAMPER SYSTEM AND ACOUSTIC BUSHING FOR A VEHICLE

CROSS-REFERENCE TO RELATED APPLICATION

This application claims the priority of German patent application No. 10 2022 109 642.4, filed on Apr. 21, 2022, which is hereby incorporated in its entirety by reference.

BACKGROUND

Technical Field

The disclosure relates to the reduction of vibration-related noise in vehicles. The disclosure relates for example to a damper system for damping vibrations of an assembly unit of a vehicle and to an acoustic bushing for coupling the assembly unit to a support structure which is part of the vehicle, i.e. which can already be provided in the vehicle or which is provided as an additional attached structure, in a vibration-damping way.

Related Art

Vehicle assembly units having one or more rotating or reciprocating components are stimulated to vibrate by the movement of the respective component, wherein the vibrations are absorbed at bearing points of the vehicle assembly unit. In order to damp the vibrations and the associated noise, the vehicle assembly unit is supported on a support structure of the vehicle, for example on the housing of another assembly unit or on a structure of the vehicle body, at the relevant bearing points by elastomeric dampers.

Ancillary assembly units, such as for example pumps, compressors, and fans, often generate high-frequency vibrations which can be over 400 Hz or over 800 Hz and which in most cases have only small amplitudes of less than 0.01 mm. The vibrations are transmitted to adjacent components and can lead to mechanical and acoustic vibrations at various points throughout the vehicle. In order to decouple the high frequencies, soft-tuned dampers are used in order to achieve the broadest possible insulation. The dampers take up a lot of installation space and are themselves stimulated to vibrate disruptively from without, for example by bumps in the road surface, via the vehicle body.

SUMMARY

It is an object of the disclosure to mount an assembly unit of a vehicle in an improved way with respect to damping vibrations.

The subject of the disclosure is a damper system for damping vibrations of an assembly unit of a vehicle. The vehicle can for example be a motor vehicle, such as for example a passenger or commercial road vehicle, or also for example a rail vehicle. The assembly unit can for example be an ancillary assembly unit, such as for example a pump, a compressor, a fan, an alternator, or a servomotor.

The damper system comprises one or for example more than one main vibration damper for mounting the assembly unit in the vehicle in a vibration-damping way. The respective main vibration damper is tuned to vibrations from a lower frequency range. The damper system additionally comprises one or for example more than one acoustic bushing for coupling the assembly unit to a support structure of the vehicle in a vibration-damping way. The respective acoustic bushing is tuned to vibrations from a higher frequency range which is above and does not overlap with the lower frequency range. The one or more acoustic bushings are thus (each) harder-tuned than the one or more main vibration dampers. Low-frequency vibrations are for example damped at least primarily by the respective main vibration damper and/or higher-frequency vibrations are for example damped at least primarily by the respective acoustic bushing. The respective acoustic bushing can be designed such that it transmits low-frequency vibrations from the lower frequency range with broadly no damping.

Low-frequency stimulation, caused for example by bumps in the road surface, can be transmitted to the assembly unit from without via bearing points. Higher-frequency stimulation, coming for example from the assembly unit, can be introduced into bearing points of the assembly unit and, if insufficiently damped, can lead to unwanted noise. The disclosure improves damping across the occurrent frequency range, by providing a damper system comprising at least two different dampers, i.e. the at least one main vibration damper and the at least one acoustic bushing, which are tuned differently with respect to the spectrum of vibrations to be expected, the damping properties of which are therefore adapted to the vibration frequencies which are primarily to be damped in each case.

Wherever "a" or "the" main vibration damper or "a" or "the" acoustic bushing alone is mentioned in the following without being further differentiated, the respective statements also apply equally to any optionally additional main vibration damper and/or acoustic bushing of the damper system. The intention is merely to avoid the repetitive use of the terms "respective main vibration damper" and "respective acoustic bushing".

The main vibration damper and acoustic bushing can be tuned in that the main vibration damper has a first natural frequency in the lower frequency range and the acoustic bushing has a first natural frequency in the higher frequency range. If, in order to perform its function, the main vibration damper and/or acoustic bushing can (each) absorb and damp multiple different vibration modes, for example one or more translational vibrations in mutually orthogonal planes and/or one or more rotational vibrations about mutually orthogonal axes, the main vibration damper and/or acoustic bushing can have a different first natural frequency for each of the different vibration modes. The lowest of the multiple different first natural frequencies of the main vibration damper can for example be in the lower frequency range. The lowest of the multiple different first natural frequencies of the acoustic bushing can for example be in the higher frequency range.

In developments, the main vibration damper has a first natural frequency in the lower frequency range for each of at least two different vibration modes. In advantageous embodiments, the acoustic bushing has a first natural frequency in the higher frequency range for each of at least two different vibration modes.

The acoustic bushing can have a first natural frequency from the higher frequency range for each of one or more different translational vibration modes. The acoustic bushing can thus have a first natural frequency for axial vibrations, i.e. vibrations which are parallel to a longitudinal axis of the acoustic bushing, and a first natural frequency for radial vibrations, i.e. vibrations which are radial with respect to the longitudinal axis of the acoustic bushing, each from the higher frequency range. The first natural frequency for axial vibrations and the first natural frequency for radial vibrations are advantageously in a ratio of 1:2 to 2:1 with respect to each other. In such embodiments, the first natural frequency for axial vibrations is at least half and at most twice as high as the first natural frequency for radial vibrations. In advantageous embodiments, the acoustic bushing is embodied and tuned to absorb these two translational vibration modes.

The main vibration damper can be tuned to one or more translational vibration modes. Expediently, these vibration modes are mutually orthogonal translational vibration modes. If the main vibration damper is for example likewise formed in the manner of a bushing, the main vibration damper can be designed to absorb axial vibrations. In a further development, the main vibration damper can additionally be designed to absorb radial vibrations, i.e. vibrations which are radial with respect to its longitudinal axis. In such embodiments, the first natural frequency for axial vibrations can for example be in the lower frequency range. In a further development, the first natural frequency for radial vibrations can also be in the lower frequency range.

The damping effect of the two different types of vibration dampers is based on the dissipation of vibration energy. If the energy dissipated in the respective vibration damper is plotted against the vibration frequency, then the main vibration damper can advantageously be tuned such that a global maximum of the vibration energy dissipated by the main vibration damper is in the lower frequency range. The acoustic bushing can for example be designed such that a global maximum of the vibration energy which it dissipates is in the higher frequency range.

The lower frequency range can be up to 50 Hz or even up to 75 Hz. The main vibration damper is correspondingly tuned to dissipate vibration energy from this frequency range. In most cases, it is sufficient for the main vibration damper to be designed to damp vibrations in the range of 5 to 30 Hz or 10 to 30 Hz. In advantageous embodiments, the higher frequency range to which the acoustic bushing is tuned is above 100 Hz or above 200 Hz. The acoustic bushing can for example be tuned to damp vibrations in the range of above 400 Hz.

In thusly advantageous embodiments of the damper system, the main vibration damper has one or more first natural frequencies for translational damper vibrations and/or one or more first natural frequencies for rotational damper vibrations of at most 75 Hz or at most 50 Hz, while the acoustic bushing has a first natural frequency for axial vibrations and/or a first natural frequency for radial vibrations and/or a first natural frequency for rotational vibrations of above 100 Hz or above 200 Hz or above 400 Hz.

In typical applications, the vehicle assembly unit to be decoupled has a housing and one or more rotary components which are rotatably mounted in or on the housing, such as for example an electric motor and/or an impeller for delivering a fluid, or a reciprocating-stroke component. The purpose of the damper system is to mount the housing and vibrationally decouple it from its surroundings in the vehicle. If, while in operation, the rotary component vibrates due to an imbalance and/or changes in its rotational speed or a reciprocating component vibrates solely due to its reciprocating movement, the vibrations of the rotary or reciprocating component generate vibrations in the housing where the rotational or reciprocating component is mounted, which can also lead to resonance vibrations in the housing. The acoustic bushing is for example tuned to one or more resonant frequencies of the housing, wherein the one or more resonant frequencies occur during operation at rotational speeds above 500 rpm or above 1000 rpm or at strokes which change direction over 500 or over 1000 times per minute. In typical applications, however, the resonant frequencies of the assembly unit are above the one or more natural frequencies with regard to which the acoustic bushing is tuned.

If the damper system comprises multiple acoustic bushings, the multiple acoustic bushings can for example be identical to each other. Two identical acoustic bushings are tuned identically with regard to the dissipation of vibration energy. In advantageous embodiments, they are identical in design. In a modification, the damper system has acoustic bushings which differ from each other. It can then have a first acoustic bushing and a second acoustic bushing which differ from each other with respect to their spring rigidity. This can be advantageous if, for reasons of the limited installation space available, the acoustic bushings can only be arranged markedly asymmetrically with respect to the mass of the vehicle assembly unit, such that fewer acoustic bushings can for example be arranged on one side of the center of mass of the vehicle assembly unit than on the other side. If, for example, only one acoustic bushing can be arranged on one side of the center of mass, while two or more acoustic bushings can be installed on the opposite side, it is advantageous if the spring rigidity of the one acoustic bushing is as high as the sum of the spring rigidities of the acoustic bushings arranged on the other side.

The one or more main vibration dampers can correspond, with regard to tuning, to the vibration dampers for ancillary assembly units, such as for example coolant compressors, coolant pumps, oil pumps and the like, which are common in vehicle manufacturing. The acoustic bushing, by contrast, is harder-tuned and can accordingly have a higher spring rigidity with respect to one or more different vibration modes than the main vibration damper.

In advantageous embodiments, the acoustic bushing comprises an inner core, an outer sleeve, and an elastomer structure which surrounds the inner core and is surrounded by the outer sleeve. The inner core has an outer circumferential surface extending about a longitudinal axis of the acoustic bushing. The elastomer structure surrounds the outer circumferential surface of the inner core in areal contact. The outer sleeve has an inner circumferential surface which surrounds an outer circumferential surface of the elastomer structure in areal contact and also surrounds the outer circumferential surface of the inner core in the region of the areal contact. The elastomer structure couples the inner core and the outer sleeve in the areal contact such that shear forces are transmitted and/or torques are transmitted with respect to the longitudinal axis. Relative translational and/or rotational movements between the inner core and the outer sleeve are only possible within the scope of the elasticity of the elastomer structure. It is advantageous if the inner circumferential surface of the outer sleeve in the areal contact with the elastomer structure, and the outer circumferential surface of the inner core in the areal contact with the elastomer structure, axially overlap each other over at least most of the respective length, for example over at least 70% of their lengths.

The elastomer structure can advantageously encircle the inner core completely, i.e. form a self-contained ring. Expediently, the elastomer structure is fully circumferential and self-contained and can fill an annular volume remaining between the inner core and the outer sleeve. In advantageous embodiments, the inner core and/or the outer sleeve completely encircle(s) the longitudinal axis of the acoustic bushing, i.e. is/are self-contained or has/have at least one self-contained axial annular portion.

The outer circumferential surface of the inner core which is in areal contact with the elastomer structure, and/or the inner circumferential surface of the outer sleeve which is in areal contact with the elastomer structure, can (each) be circular and for example circular-cylindrical. It is however more advantageous if the outer circumferential surface of the inner core or the inner circumferential surface of the outer sleeve is noncircular, i.e. deviates from a circular shape. Both circumferential surfaces are for example noncircular, wherein it is favorable if the noncircular circumferential surfaces are adapted to each other, such that they follow each other at an at least substantially identical distance. In advantageous embodiments, the outer circumferential surface of the inner core and/or the inner circumferential surface of the outer sleeve is/are polygonal in their areal contact with the elastomer structure. Both circumferential surfaces are for example polygonally adapted to each other. In such embodiments, the elastomer structure is correspondingly likewise noncircular and for example polygonal. The respective polygon is for example regular. The polygonal shape is for example a hexagon.

If the outer circumferential surface of the inner core and the inner circumferential surface of the outer sleeve are noncircularly adapted to each other, the inner core and the outer sleeve can be twisted relative to each other about the longitudinal axis of the acoustic bushing by a certain amount, called the lead angle, when the acoustic bushing is not subject to a load, such that they can be rotated relative to each other about the longitudinal axis by the lead angle against an elastic restoring force of the elastomer structure out of the initial state, in which the acoustic bushing is not subject to a load, into a rotational angular position in which the outer circumferential surface of the inner core and the inner circumferential surface of the outer sleeve are parallel to each other and/or concentric with respect to the longitudinal axis over at least most of their circumference and for example throughout their circumference. The acoustic bushing can thus be biased by the relative rotation, i.e. by a torsion of the elastomer structure, wherein said circumferential surfaces are parallel when biased, at least in portions and for example throughout their circumference. If the two circumferential surfaces are polygonal in cross section, then at least the longitudinal sides of the polygons are for example parallel to each other. If the coupling to the vehicle assembly unit is for example realized by means of a screw connection, wherein the longitudinal axis of the acoustic bushing is also the axis of the screw connection, a tightening torque which acts on the acoustic bushing when the screw connection is established can be compensated for. The acoustic bushing advantageously has a torsional rigidity which corresponds to the predetermined or expected tightening torque. In such an embodiment of the acoustic bushing, it is not necessary to hold the acoustic bushing in place when establishing the screw connection in order to support the tightening torque.

Because the frequency of the vibrations to be damped is higher than that of the main vibration damper, a high torsional rigidity of the acoustic bushing is desirable. It is advantageous if the noncircular outer circumferential surface of the inner core and the noncircular inner circumferential surface of the outer sleeve are rotated relative to each other about the longitudinal axis by only a small lead angle of for example at least 1° or at least 1.5° out of parallelism when the acoustic bushing is not subject to a load. The lead angle is for example at most 6° or at most 5°. In terms of high spring rigidity, for example against torsion, it is advantageous if a biasing force which corresponds to the tightening torque is achieved even at a small lead angle.

The outer sleeve can be designed for joining to the vehicle assembly unit or for example to the support structure such that shear forces are transmitted and/or torques are transmitted about the longitudinal axis of the acoustic bushing. The inner core can be designed for joining to the support structure or for example to the vehicle assembly unit such that shear forces are transmitted and/or torques are transmitted about the longitudinal axis. In developments, the outer sleeve has a noncircular, for example polygonal, outer circumferential surface for joining. Although the noncircular outer circumferential surface can extend over the entire length of the outer sleeve, the outer sleeve for example has a joining portion comprising the noncircular outer circumferential surface. In advantageous embodiments of the acoustic bushing, the joining portion extends over most of the length of the outer sleeve. The noncircular inner circumferential surface of the outer sleeve, the outer circumferential surface of the inner core and the elastomer structure for example overlap over at least most of the respective length, for example over more than 70% of the respective length.

In order to join it to the support structure or for example to the vehicle assembly unit, the inner core can have a cavity which extends in the longitudinal direction and around which the outer circumferential surface of the inner core extends. The cavity emerges on at least one of the two facing sides, for example at a facing end, of the inner core, such that a fastening element can be inserted into the cavity in order to join the assembly unit to the acoustic bushing and thus mount it by means of the acoustic bushing. It is for example a passage which extends axially through the inner core from one facing side to the other. The cavity or passage extends for example centrically with respect to the outer circumferential surface of the inner core. The cavity for example has a joining structure for joining to the vehicle assembly unit. The joining structure can for example be an internal thread for screw-fastening the vehicle assembly unit. It can for example be screw-fastened by means of a threaded bolt as a fastening element, which extends through a fastening portion of the vehicle assembly unit up to and into threaded engagement with the internal thread of the inner core, such that the vehicle assembly unit is pressed, by means of the threaded bolt, axially against a facing end of the acoustic bushing which faces it. The cavity need not necessarily have a joining structure for a joining engagement directly with a fastening element; it can for example simply be smooth. A threaded bolt which forms the fastening element can then for example be long enough that it protrudes through the passage and such that a threaded portion of it protrudes beyond a rear facing end of the inner core which faces axially away from the vehicle assembly unit. In such embodiments, the tightening torque for establishing an axial press fit with the vehicle assembly unit is applied by means of a threaded nut which is tightened in threaded engagement with the threaded bolt and pressed against the rear facing side of the inner core.

In a development, an end portion of the inner core protrudes axially beyond the outer sleeve and has a facing surface for an axial pressure contact with the support structure or for example with the vehicle assembly unit, in order to establish an axial press fit with the support structure or for example with the vehicle assembly unit. Such an embodiment is for example advantageous when, as described above, the acoustic bushing has an axially extending cavity or passage having an internal thread for a threaded engagement with a threaded element which serves the purpose of fastening.

The support structure or for example the vehicle assembly unit is only in contact with the inner core when coupled, and the vibrations of the assembly unit are transmitted, with damping, to the support structure via the elastomer structure in the transmission path provided by means of the acoustic bushing.

The outer sleeve of the acoustic bushing can have a joining portion, for joining to the assembly unit or for example to the support structure, and a flange which protrudes radially outward beyond the joining portion, such that the respective acoustic bushing can be pressed axially against the joining partner, for example the support structure, by means of the flange. The flange can form an axial abutment for axially fixing the outer sleeve. The inner circumferential surface of the outer sleeve can extend in the areal contact with the elastomer structure over at least most of its length in the joining portion and for example also in the region of the flange.

The inner core, the outer sleeve and the elastomer structure can each have a flange, and the flange of the elastomer structure can protrude radially outward, axially between the flange of the inner core and the flange of the outer sleeve, such that the flange of the elastomer structure can be elastically compressed axially between the flange of the inner core and the flange of the outer sleeve. The adjustability of the spring rate is improved by distributing the elastomeric material of the elastomer structure both circumferentially between the inner core and the outer sleeve and on the facing side between the flange of the inner core and the flange of the outer sleeve. High spring rates can be adjusted flexibly and precisely in accordance with the respective application. The spring rates in the axial and radial direction can be specifically tuned. The ratio of the axial spring rate to the radial spring rate can for example be adjusted by correspondingly varying the thickness of the flange of the elastomer structure as measured in the longitudinal direction.

An axial end portion of the acoustic bushing—advantageously, an axial end portion of the joining portion which has already been described with respect to the outer sleeve—can have a latching protrusion which protrudes radially outward or multiple latching protrusions which are distributed about the longitudinal axis and which each protrude radially outward, in order to axially secure the acoustic bushing, when joined, relative to the joining partner, for example the support structure. The respective latching protrusion can serve as an anti-loss securing device if the acoustic bushing is damaged, for example breached. If the outer sleeve has the flange described above, this flange and the one or more latching protrusions can oppose each other at an axial distance from each other across the joining portion.

The damper system can also comprise the support structure. The acoustic bushing and optionally one or more additional acoustic bushings of the damper system, and the main vibration damper and optionally one or more additional main vibration dampers of the damper system, can be joined to the support structure. The assembly unit is fastened or is already fastened to the acoustic bushing. The respective main vibration damper for example remains free of the assembly unit and serves to mount the support structure in the motor vehicle, for example on a vehicle body structure or other assembly unit of the vehicle. The support structure can therefore serve as a decoupling structure, by attaching the assembly unit to the support structure with a comparatively hard spring suspension by means of the one or more acoustic bushings, while the support structure together with the assembly unit is supported on another structure with a comparatively soft spring suspension by means of the one or more main vibration dampers.

The support structure can be molded in one part. Alternatively, it can comprise multiple sub-structures which are separately molded and joined to each other, for example a support base structure and an adapter structure, which is joined to the support base structure, for accommodating the one or more acoustic bushings.

In addition to the damper system, the disclosure also relates to an acoustic bushing for coupling an assembly unit of a vehicle to a support structure, which can already be provided in the vehicle or which is provided as an additional attached structure, in a vibration-damping way. Wherever the subject matter of the disclosure relates to the acoustic bushing per se, it has at least the inner core, the outer sleeve and, radially between these two structures, the elastomer structure which couples the inner core and the outer sleeve such that shear forces and/or torques are transmitted within the scope of its elasticity, wherein the coupling surface of the inner core, i.e. its outer circumferential surface, and the coupling surface of the outer sleeve, i.e. its inner circumferential surface, are each noncircular and for example polygonal. The acoustic bushing per se can advantageously be further developed by one or more of the features which are disclosed in connection with the acoustic bushing of the damper system. Wherever features for the acoustic bushing of the damper system are disclosed, they are thus also suitable for developing the acoustic bushing per se.

If the acoustic bushing has an inner core, an outer sleeve, and an elastomer structure in one of the embodiments disclosed, the inner core and outer sleeve move relative to each other parallel to the longitudinal axis of the acoustic bushing and vibrate in the axial vibration mode. The inner core and the outer sleeve move relative to each other radially with respect to the longitudinal axis of the acoustic bushing and vibrate in the radial vibration mode. The inner core and the outer sleeve move relative to each other about the longitudinal axis of the acoustic bushing and vibrate in the rotational vibration mode.

BRIEF DESCRIPTION OF THE DRAWINGS

An example embodiment of the disclosure is described below on the basis of figures. Features disclosed by the example embodiment, each individually and in any combination of features, develop the claims and the embodiments described above.

DETAILED DESCRIPTION

Figure 1:
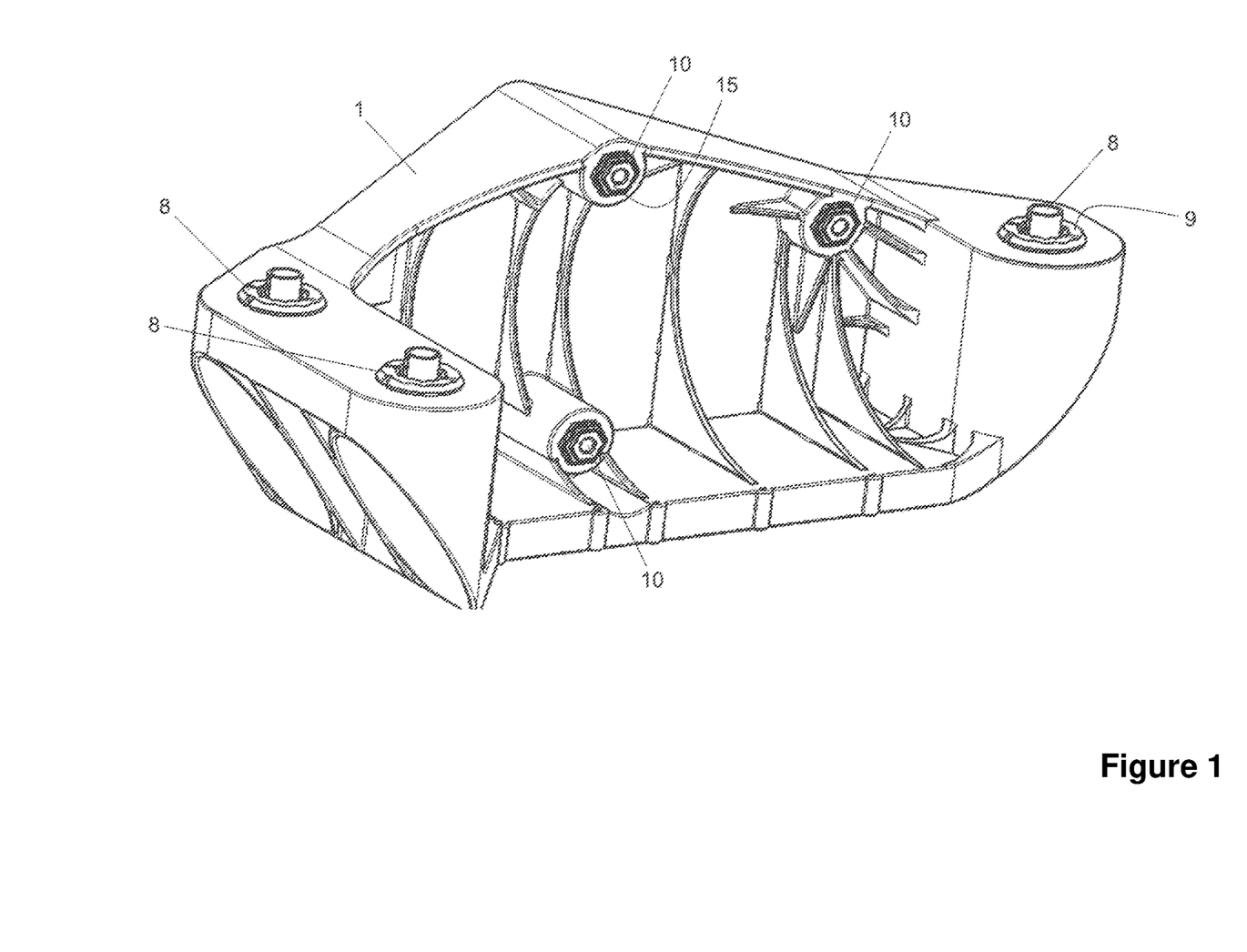
FIG. 1 shows a damper system comprising multiple vibration dampers, and a support structure for mounting an assembly unit of a vehicle in a vibration-damping way.

FIG. 1 shows a bearing arrangement for mounting an assembly unit of a vehicle, for example a coolant compressor, in a vibration-damping way. The bearing arrangement comprises a support structure 1 and a damper system comprising multiple vibration dampers by which the vehicle assembly unit can be supported in the vehicle. The damper system comprises multiple main vibration dampers 8 and multiple acoustic bushings 10—in the example embodiment, three main vibration dampers 8 and three acoustic bushings 10. The main vibration dampers 8 and the acoustic bushings 10 are each joined to the support structure 1.

The main vibration dampers 8 are joined to the support structure 1 such that they each have a free facing surface 9 for pressure contact with another structure of the vehicle, for example a vehicle body structure or a housing of another assembly unit of the vehicle. The acoustic bushings 10 each have a free facing surface 15 for pressure contact with the vehicle assembly unit. The arrangement of the vibration dampers 8 and 10 can, as in the example embodiment, be selected such that the facing surfaces 9 of the main vibration dampers 8 each point in a direction orthogonal to the facing surfaces 15 of the acoustic bushings 10. In the example embodiment, the facing surfaces 9 of the main vibration dampers 8 are parallel to each other. The facing surfaces 15 of the acoustic bushings 10 are also parallel to each other. This arrangement is merely an example. The main vibration dampers 8 can thus also be oriented differently in terms of their direction. The same applies with respect to the acoustic bushings 10. One of the acoustic bushings 10 can for example have the same orientation as one of the main vibration dampers 8. In an extreme case, it is also possible for all of the vibration dampers 8 and 10 of the damper system to be arranged in a parallel orientation of their facing surfaces 9 and 15 provided for the pressure contact.

Figure 2:
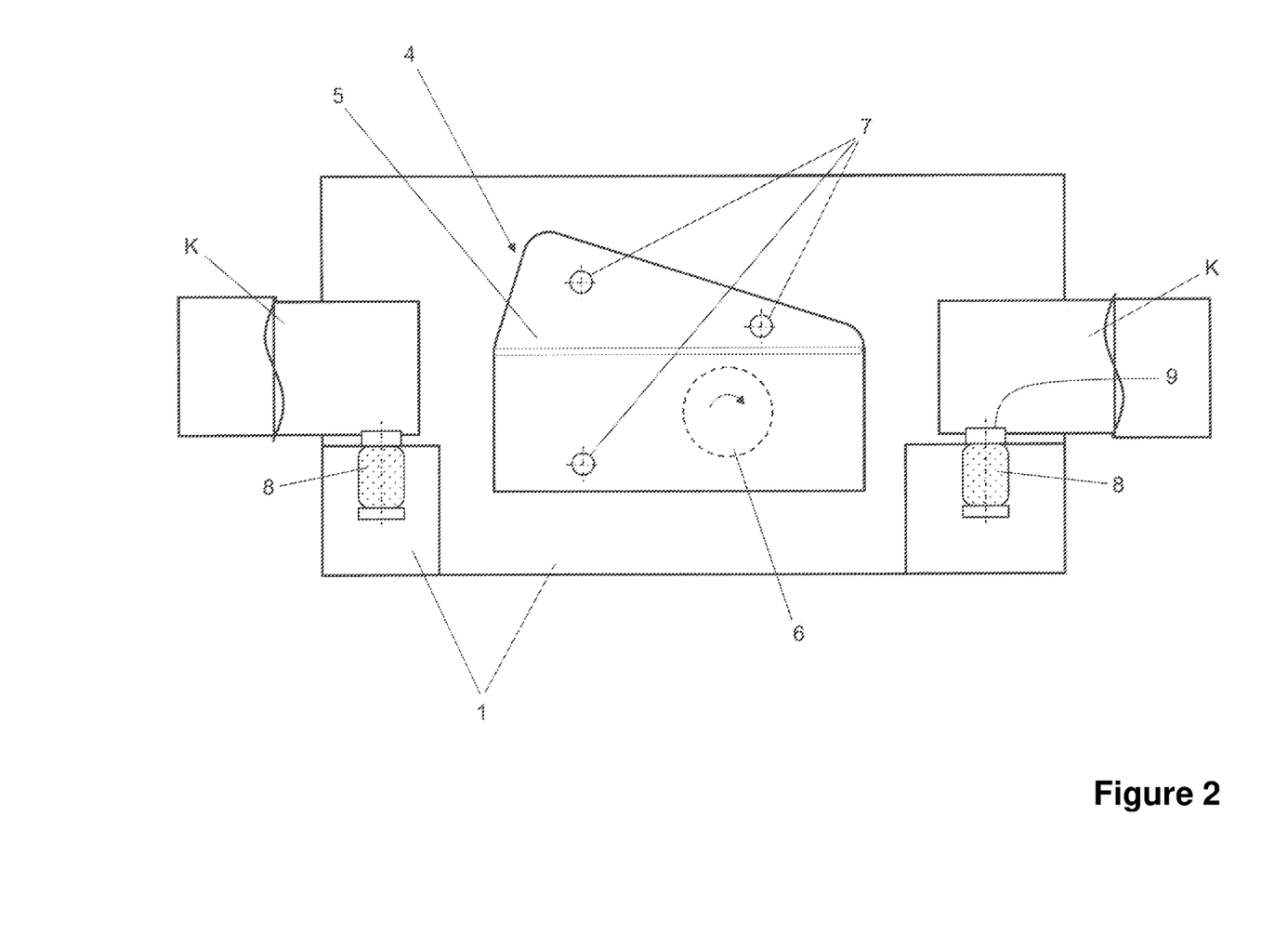
FIG. 2 shows mounting a vehicle assembly unit by means of the damper system.

FIG. 2 shows a schematic representation of the bearing arrangement, including an assembly unit 4 which is supported on the support structure 1 by the acoustic bushings 10. The support structure 1 is supported in the motor vehicle, for example on a vehicle body structure K, by the main vibration dampers 8. The main vibration dampers 8 each have a damper structure which is joined to the support structure 1, a damper structure which is joined to the vehicle body structure K, and an elastomer structure which is joined to each of the two damper structures such that shear forces and/or torques are transmitted and which allows the mobility, required for damping vibrations, between the two damper structures within the scope of their elasticity. The acoustic bushings 10 are not shown in FIG. 2.

The assembly unit 4 has a housing 5 and at least one rotary component 6 which is rotatably mounted in the housing 5. While the assembly unit 4 is in operation, imbalances and changes in the rotational speed of the rotary component 6 lead to vibrations, which are transmitted to the housing 5 via the rotational bearing of the rotary component 6, and to vibrations of the housing 5, including resonance vibrations as applicable. The typically high-frequency housing vibrations are absorbed by the acoustic bushings 10. In the opposite direction, vibrations of the vehicle body structure K, due for example to bumps in the road surface, are absorbed by the main vibration dampers 8. The vibratory stimulation is damped by the vibration dampers 8 and 10 and the vibrationally interposed support structure 1, and the assembly unit 4 is vibrationally decoupled from its surroundings, for example the vehicle body structure K.

The assembly unit 4—in the example embodiment, the housing 5—has one passage 7 per acoustic bushing 10 for fastening to the acoustic bushings 10. The acoustic bushings 10 are arranged in accordance with the arrangement of the passages 7, such that the respective acoustic bushing 10 is in an axial alignment with the assigned passage 7 when the assembly unit 4 is positioned relative to the support structure 1 for attaching. Once it is positioned, a screw element such as for example a threaded bolt is guided through each of the passages 7 toward the acoustic bushing 10 behind, which in FIG. 2 is hidden by the assembly unit 4, and screwed to the respective acoustic bushing 10 in order to press the assembly unit 4 axially against the acoustic bushings 10 and thus establish a press fit.

Within the scope of decoupling, the main vibration dampers 8 are primarily assigned the task of decoupling the housing 5 and therefore the assembly unit 4 as a whole from low-frequency vibrations of the surroundings—in the example embodiment, the vehicle body structure K—while the acoustic bushings 10 damp the comparatively higher-frequency vibrations of the housing 5 and thus decouple the support structure 1 and the assembly unit 4. The main vibration dampers 8 are correspondingly each tuned to vibrations from a lower frequency range, while the acoustic bushings 10 are each tuned to vibrations from a higher frequency range which does not overlap with the lower frequency range. The acoustic bushings 10 are thus harder-tuned than the main vibration dampers 8.

Figure 3:
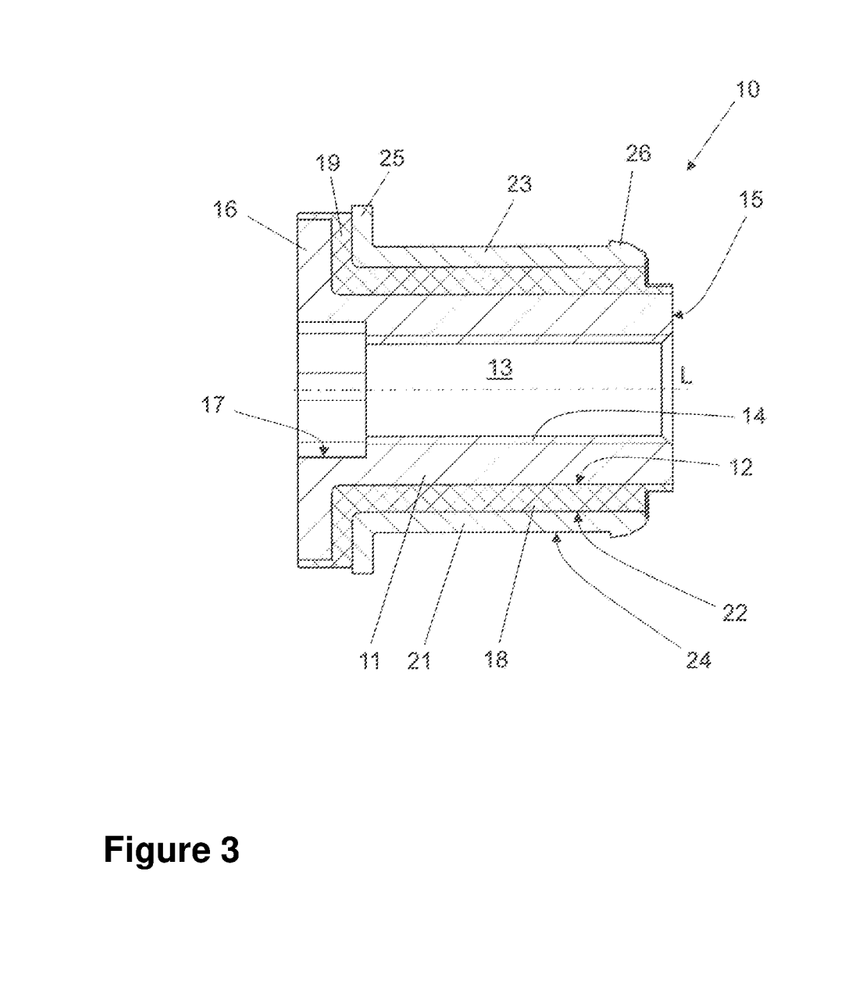
FIG. 3 shows an acoustic bushing of the damper system in a longitudinal section.
Figure 4:
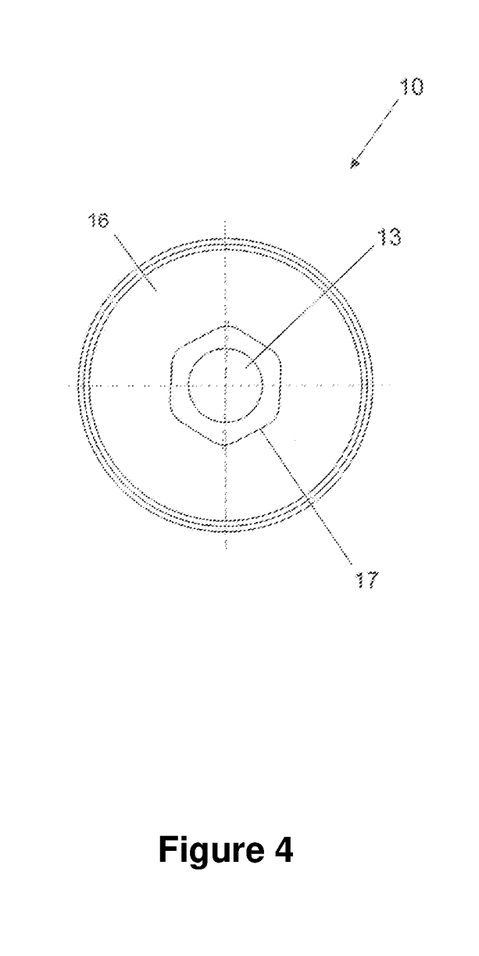
FIG. 4 shows the acoustic bushing in a view onto its facing side.
Figure 5:
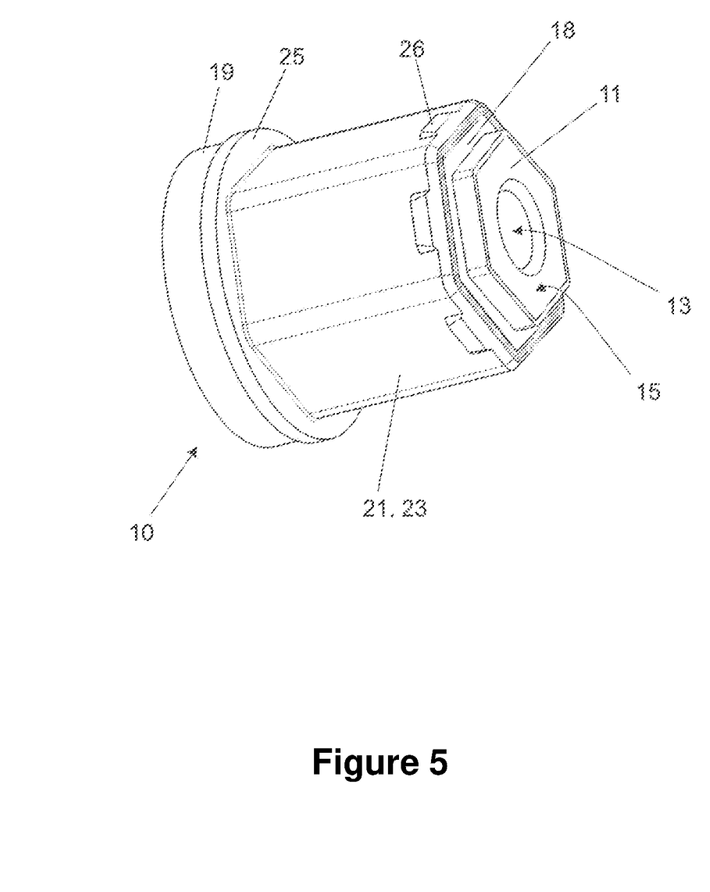
FIG. 5 shows the acoustic bushing in an isometric view onto a front facing side.
Figure 6:
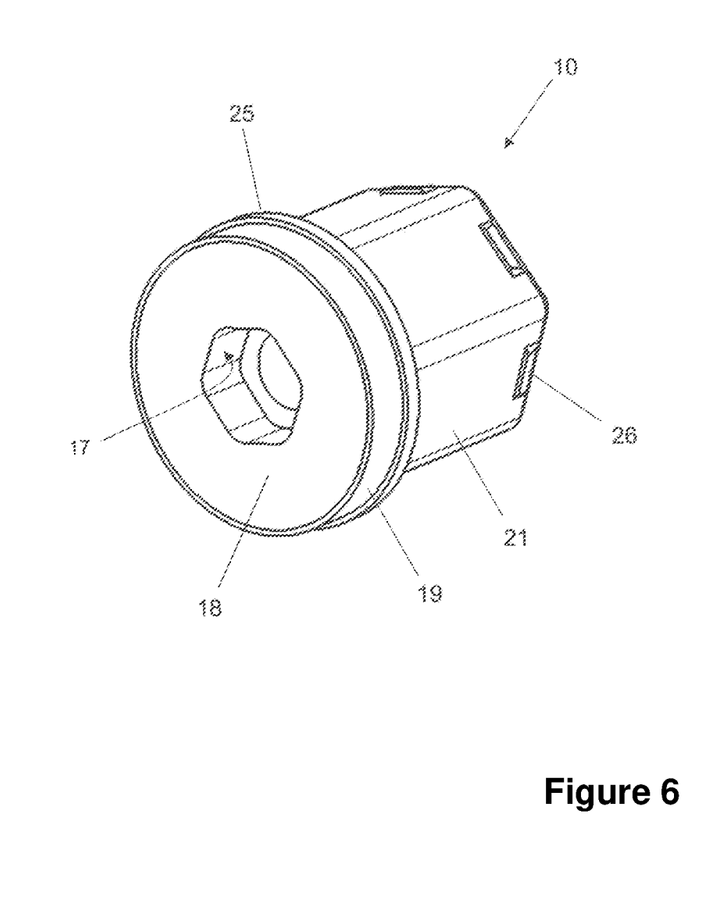
FIG. 6 shows the acoustic bushing in an isometric view onto a rear facing side.

FIGS. 3 to 6 show the acoustic bushing per se, before it is joined to the support structure 1. FIG. 3 shows one of the acoustic bushings 10 in a longitudinal section. The longitudinal section contains the central longitudinal axis L of the acoustic bushing 10. FIG. 4 is a view onto a rear facing side of the acoustic bushing 10. FIG. 5 is an isometric view onto a front facing side of the acoustic bushing 10 onto which the assembly unit 4 can be placed when joining it, and FIG. 6 is a view onto the rear facing side.

The acoustic bushing 10 comprises an inner core 11, having an outer circumferential surface 12 which extends around the longitudinal axis L, and an outer sleeve 21 having an inner circumferential surface 22 which extends around the longitudinal axis L and surrounds the outer circumferential surface 12 at a radial distance. The acoustic bushing 10 also comprises an elastomer structure 18 which is arranged within an annular volume defined on the radially inner and outer side by the circumferential surfaces 12 and 22. The elastomer material of the elastomer structure 18 for example fills the annular volume. The elastomer structure 18 is in areal contact, circumferentially around the longitudinal axis L, with both the outer circumferential surface 12 and the inner circumferential surface 22 and connects the inner core 11 and the outer sleeve 21 in areal contact such that shear forces and/or torques are transmitted within the scope of its elasticity, such that radial movements, axial movements and rotational movements about the longitudinal axis L between the inner core 11 and the outer sleeve 21 are only possible within the scope of the elasticity of the elastomer structure 18.

The acoustic bushing 10 has a central cavity 13 which extends axially within the inner core 11 and comprises a joining structure 14 for joining to the assembly unit 4 (FIG. 2). The inner core can be sleeve-shaped, as in the example embodiment, and the cavity 13 can extend through the inner core 11, as also in the example embodiment, for example as a straight passage, and is therefore also referred to in the following as a passage 13. The passage 13 can be cylindrical, for example circular-cylindrical. The joining structure 14 can for example be an internal thread for a screw engagement with a screw element.

The outer sleeve 21 has an axially extending, sleeve-shaped joining portion 23 having an outer circumferential surface 24 which is a free surface until the acoustic bushing 10 is attached. The elastomer structure 18 extends within the joining portion 23 in areal contact with the inner circumferential surface 22 and can extend in areal contact over the entire length of the joining portion 23 and for example over the entire length of the outer sleeve 21. A flange 25 protrudes radially outward from the joining portion 23 at a rear axial end of the outer sleeve 21. The flange 25 can completely encircle the longitudinal axis L, as in the example embodiment, or can in principle also be interrupted at one or more points. It can however for example be a circumferentially self-contained flange 25.

The inner core 11 has an axial sleeve portion, which the outer sleeve 21 surrounds and which has the joining structure 14, and a flange 16 which protrudes radially outward from the sleeve portion of the inner core 11 at the rear axial end of the inner core 11. The flange 16 for example encircles the longitudinal axis 11 completely and is self-contained, but can in principle be interrupted at one or more points. The flange 16 protrudes radially outward beyond the inner circumferential surface 22 of the outer sleeve 21 and opposes the flange 25 of the outer sleeve 21 at an axial distance, such that a likewise annular flange volume, into which the elastomer structure 18 extends, remains between the flanges 16 and 25 circumferentially around the longitudinal axis L. The elastomer structure 18 accordingly has a flange 19 itself, made of elastomer material, between the flanges 16 and 25. It is advantageous if the elastomer structure 18 circumferentially fills the flange volume. As a result, a radial layered structure and, in the region of the flanges 16, 19 and 25, an axial layered structure are obtained, wherein the elastomer structure 18 is arranged between the inner core 11 and the outer sleeve 21 in both the radial and axial layered structure and couples them in the respective areal contact, but prevents direct contact between the inner core 11 and the outer sleeve 21 and in this sense separates the inner core 11 and the outer sleeve 21 from each other.

An anti-loss securing device is provided by the flange 16 of the inner core 11 protruding radially beyond the inner circumferential surface 22 of the outer sleeve 21.

A front axial end portion of the inner core 11 protrudes beyond the outer sleeve 21, such that a front facing surface 15 of the inner core 11 simultaneously forms the front facing end of the acoustic bushing 10. The facing surface 15 forms a joining surface against which the assembly unit 4 is pressed in an axial pressure contact when the assembly unit 4 is joined, in order to form an axial press fit between the inner core 11 and the assembly unit 4.

The outer sleeve 21 serves to join the acoustic bushing 10 to the support structure 1. Its outer circumferential surface 24 is noncircular, for joining such that torques are transmitted, such that it can be accommodated in a correspondingly noncircularly shaped passage of the support structure 1 in a positive fit and for example in a pressing fit. The outer circumferential surface 24 can be polygonal, for example hexagonal, as in the example embodiment.

The passage 13 of the inner core 11 widens radially in a rear axial end portion. In the widened end portion, the passage 13 has a noncircular, for example polygonal, inner circumference 17 which can for example be hexagonal, as shown in the view in FIG. 4 and the isometric view in FIG. 6. The end portion which exhibits the noncircular inner circumference 17 serves to join the acoustic bushing 10 to the support structure 1. By means of a joining tool which is noncircularly shaped in accordance with the inner circumference 17, the acoustic bushing 10 can be positioned, before it is inserted into the passage of the support structure 1, in a rotational angular position in which the noncircular outer circumferential surface 24 of the acoustic bushing 10 is correctly positioned with respect to the correspondingly shaped passage of the support structure 1, such that the acoustic bushing 10 can be pushed by a pressing force into the passage of the supporting structure 1 up to and into a position in which the flange 25 of the acoustic bushing 10 abuts a facing surface of the support structure 1. The front facing surface 15 of the acoustic bushing 10 then protrudes axially beyond the support structure 1.

In its front axial end portion, the outer sleeve 21 has multiple latching protrusions 26, distributed about the longitudinal axis L, which slightly protrude radially outward from the outer circumferential surface 24, and the rear facing surfaces of which oppose and axially face the flange 25. The outer circumferential surface 24 which serves as a joining surface extends axially from the flange 25 up to and into the region of the latching protrusions 26.

Figure 7:
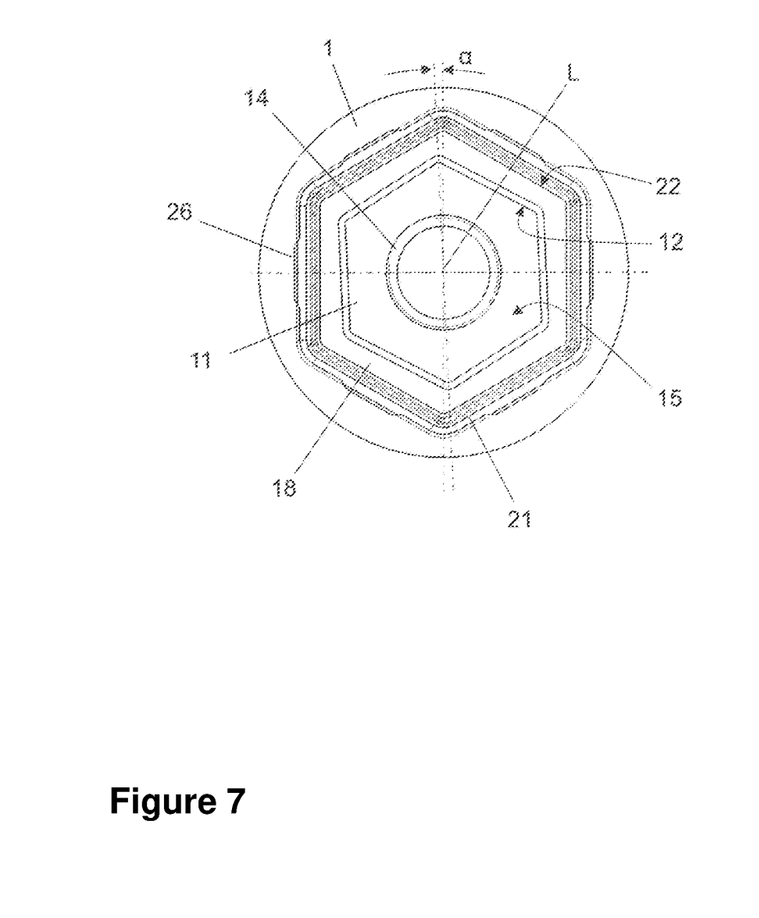
FIG. 7 shows a detail of the support structure with the acoustic bushing attached, in a view onto its facing side.
Figure 8:
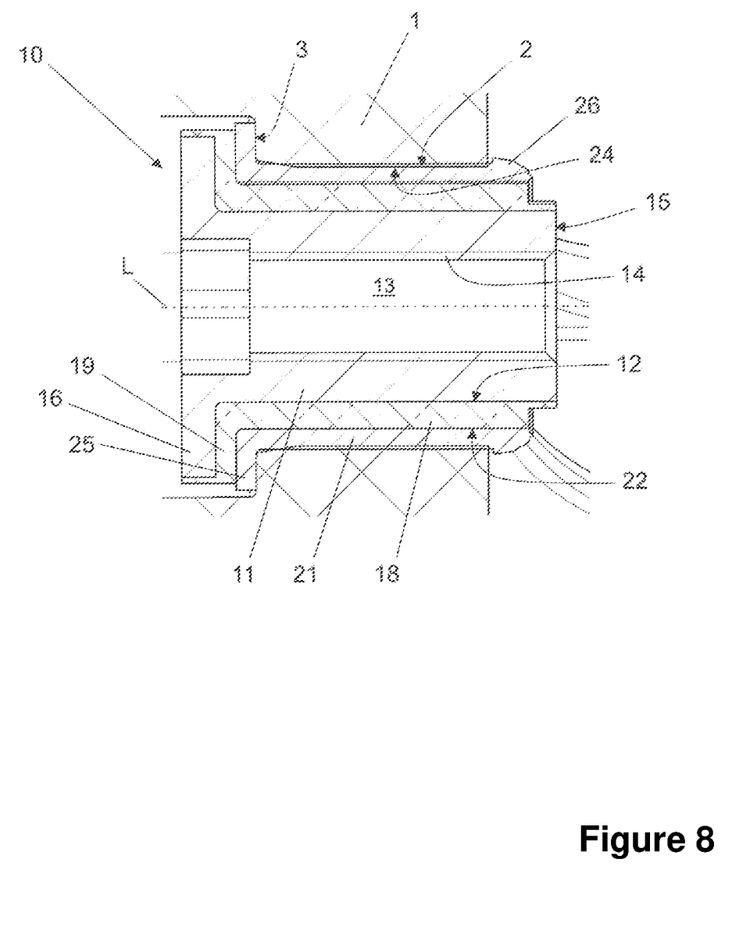
FIG. 8 shows the acoustic bushing, attached, in a longitudinal section.

FIGS. 7 and 8 show the acoustic bushing 10 attached, wherein the outer sleeve 21 is immovably joined to the support structure 1 in a pressing fit. FIG. 7 is an axial view onto the front facing side of the acoustic bushing 10. FIG. 8 shows the acoustic bushing 10, in the same longitudinal section as FIG. 3, and additionally the support structure 1 in the region of the attaching location.

The acoustic bushing 10 is attached by being pushed into a passage 2 of the support structure 1 until the flange 25 of the outer sleeve 21 abuts a rear facing surface 3 of the support structure 1. The abutting contact between the flange 25 and the facing surface 3 determines the axial position of the acoustic bushing 10 relative to the support structure 1. When fully attached, the acoustic bushing 10 protrudes through the passage 2, such that the front facing surface 15 of the inner core 11 protrudes freely beyond the support structure 1 at least in the region of the passage 2. The outer sleeve 21 also protrudes through the passage 2, wherein the latching protrusions 26 protrude radially beyond the passage 2. When attached, the latching protrusions 26 each have a small axial distance between their rear facing surfaces and a front facing surface of the support structure 1. The latching protrusions 26 do not therefore serve a fixing function but rather merely a securing function in case the acoustic bushing 10 were to be damaged. The flange 25 and the latching protrusions 26 also then hold the acoustic bushing 10 securely on the support structure 1.

As already mentioned, the outer circumferential surface 24 of the outer sleeve 21 is noncircular—in the example embodiment, hexagonal—in accordance with the cross section of the passage 2 of the support structure 1. The passage 2 of the support structure 1 is thus defined by a noncircular—in the example embodiment, hexagonal—inner circumferential surface of the support structure 1. When attached, the outer circumferential surface 24 of the outer sleeve 21 is seated in a pressing fit in the passage 2, and the outer sleeve 21 is additionally prevented from rotating relative to the support structure 1 by the positive-fit engagement between the two noncircular circumferential surfaces 2 and 24.

The view in FIG. 7 and also the isometric view in FIG. 5 show that the outer circumferential surface 12 of the inner core 11 and the inner circumferential surface 22 of the outer sleeve 21 are correspondingly noncircular. In the example embodiment, the two circumferential surfaces 12 and 22 are each hexagonal. The circumferential surfaces 12 and 22 can in principle also be correspondingly noncircular in a different way, but a polygonal and for example hexagonal shape with rounded corner regions is for example advantageous. The circumferential surfaces 12 and 22 follow each other at a radial distance throughout their circumference. The flat sides are parallel to each other.

If the acoustic bushing 10 is considered per se, i.e. in an initial state in which it is not subject to a load, the noncircular circumferential surfaces 12 and 22 are twisted relative to each other about the longitudinal axis L by a lead angle. In this relative rotational angular position, the inner core 11 and the outer sleeve 21 are also still attached, but the press fit with the assembly unit 4 is not yet established. The lead angle is therefore shown in FIG. 7 and denoted by "α".

When the assembly unit 4 is attached, the inner core 11 is rotated, against the elastic restoring force of the elastomer structure 18, due to the tightening torque acting via the screw engagement of the joining structure 14, about the longitudinal axis L and toward the concentric position, relative to the outer sleeve 21 which is prevented from rotating along with it. The spring rigidity of the elastomer structure 18 is adjusted to the tightening torque required to establish the press fit, which is expediently predetermined, such that the relative rotation of the inner core 11 is terminated by the increasing axial pressing force between the inner core 11 and the assembly unit 4 as soon as the inner core 11 has reached the concentric position with respect to the outer sleeve 21. The spring rigidity and the lead angle α are correspondingly adjusted to each other.

With regard to the desired high spring rate (higher at least than the spring rate of the main vibration dampers 8), it is advantageous if the lead angle α is at most 6° or at most 5°. In order to ensure that the circumferential surfaces 12 and 22 are as precisely parallel as possible after the press fit has been established, it is advantageous if the lead angle α is at least 0.5° or at least 1° or at least 1.5°. Parallelism is desirable so that the elastomer structure 18 exhibits multiple rotational symmetries when biased. The circumferential surfaces 12 and 22 and accordingly the biased elastomer structure 18 should each and, when biased, for example jointly exhibit at least three and for example six rotational symmetries. In this way, a broad invariance with respect to changes in the direction of the radial vibrations of the assembly unit 4 is achieved.

The acoustic bushing 10 damps vibrations which the assembly unit 4 produces in the radial and axial direction in relation to the longitudinal axis L of the acoustic bushing 10. Torsional vibrations, i.e. vibratory tilting movements of the assembly unit 4, are also damped. Vibratory radial movements are primarily equalized by the elastomer material situated between the circumferential surfaces 12 and 22. Axial vibrations are damped by the same elastomeric material and also to a significant extent by the elastomer material of the flange 19, situated between the flanges 16 and 25. By varying the ratio of the thickness of the elastomer flange 19, as measured in the axial direction, to the length and/or radial thickness of the elastomer material situated between the noncircular circumferential surfaces 12 and 22, the spring rates in the axial and radial direction can be precisely and specifically adjusted to each other.

It should also be noted with respect to the elastomer structure 18 and the outer sleeve 21 that the front axial end of the elastomer structure 18 is not defined by the outer sleeve 21. This facilitates adjusting the axial and radial spring rates to each other.

With respect to the materials, the inner core can for example consist of a metal or metal alloy. The outer sleeve 21 is advantageously molded from plastic and can for example be molded from a thermoplastic material. Suitable elastomer materials for the elastomer structure 18 include for example ethylene propylene diene rubber (EPDM) and/or silicones, for example vinyl methyl silicone (VMQ) and/or natural rubber (NR). Thermoplastic elastomers (TPE) are also for example suitable.

Figure 9:
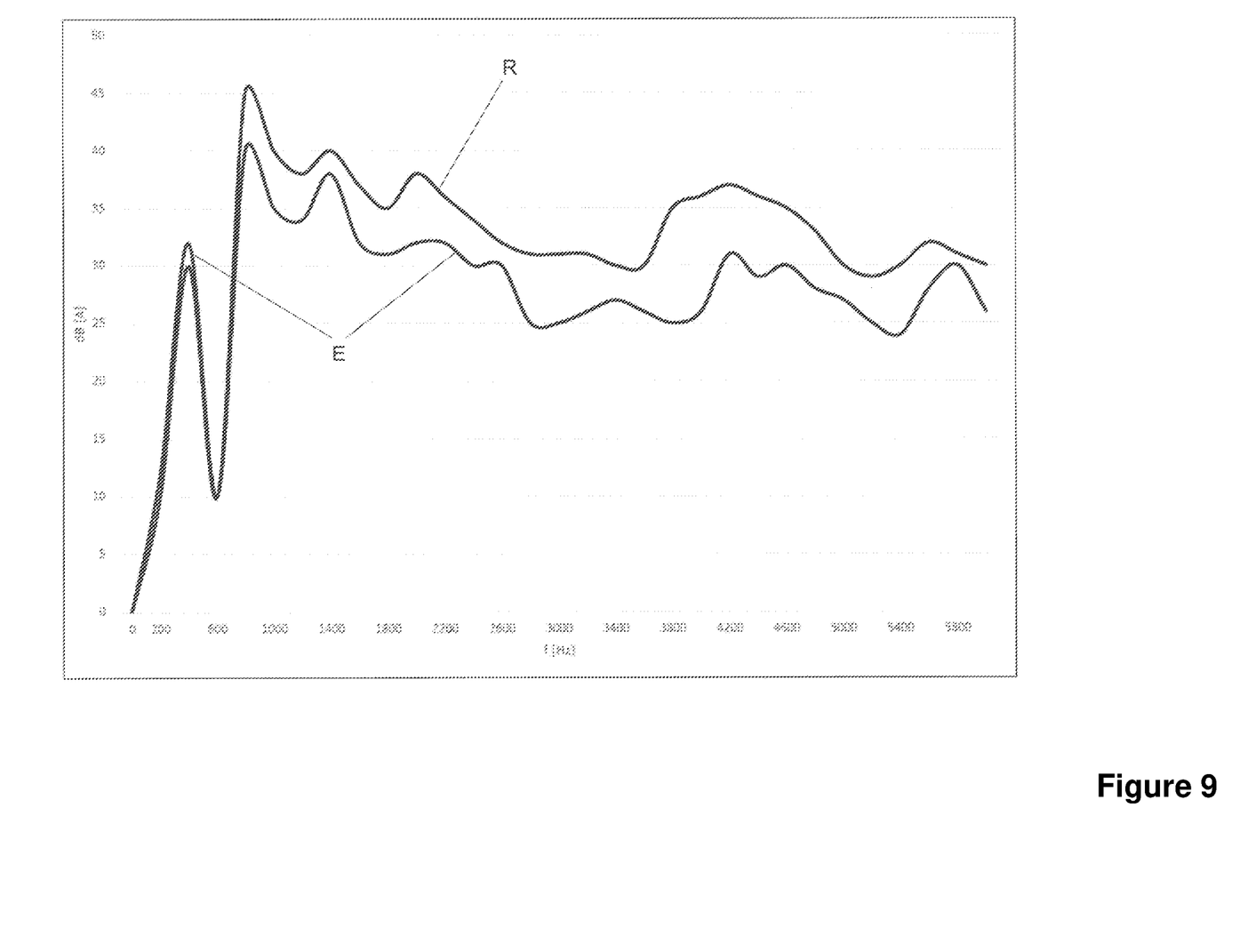
FIG. 9 shows the sound level pressure of a vehicle assembly unit mounted by means of the damper system, as compared to being conventionally mounted.

FIG. 9 shows the sound level pressure in dB(A), over the entire frequency spectrum of the vibrations occurring while a coolant compressor was in operation, which the assembly unit 4 formed in the measurements. The curve E is the sound level pressure which was measured when mounting the coolant compressor by means of the damper system in accordance with the disclosure of FIG. 1 within the scope of a first series of measurements. The support structure 1 was mounted on a vehicle body structure K by means of the main vibration dampers 8, as shown schematically in FIG. 2. The coolant compressor was coupled to the support structure 1 by means of the acoustic bushings 10 while the measurements were taken. The curve R is the sound level pressure from a series of reference measurements taken for comparison, for which the same support structure 1 was used and mounted in the same way with respect to the main vibration dampers 8. In order to take the series of reference measurements, the acoustic bushings 10 were merely replaced with simple screw inserts, via which the coolant compressor was rigidly fixed to the support structure 1 by means of a screw connection. In order to take the two series of measurements, the coolant compressor was operated over its entire operating range according to a predetermined measuring program in each case.

The noise insulation is comparable for the two measuring arrangements and/or bearing arrangements in the range below 100 Hz and also up to about 300 Hz. In the upper frequency range, for example in the entire range above about 800 Hz, the measured sound level pressure E when mounting by means of the damper system in accordance with the disclosure is significantly below the sound level pressure R of the reference measurement. A small outlier at about 400 Hz is not disruptively noticeable in the vehicle and can be tolerated or eliminated by optimizing the arrangement.

Although the disclosure has been shown and described with respect to one or more embodiments, it is clear that equivalent amendments or modifications will occur to the person skilled in the art when reading and interpreting the text and enclosed drawing(s) of this specification. With regard for example to the various functions performed by the elements (components, assemblies, devices, compositions, etc.) described above, the terms used to describe such elements (including any reference to a "means") are intended, unless expressly indicated otherwise, to correspond to any element which performs the specified function of the element described, i.e. which is functionally equivalent to it, even if it is not structurally equivalent to the disclosed structure which performs the function in the example embodiment(s) illustrated here. Moreover, while a given feature of the disclosure may have been described above with respect to only one or some of the embodiments illustrated, such a feature may also be combined with one or more other features of the other embodiments, in any way such as may be desirable or advantageous for any given application of the disclosure.

What is claimed is:

1. A damper system for damping vibrations of an assembly unit of a vehicle, the damper system comprising:
   a. one or more main vibration dampers, which is or are each tuned to vibrations from a lower frequency range, for mounting the assembly unit in the vehicle in a vibration-damping way; and
   b. one or more acoustic bushings, which is or are each tuned to vibrations from a higher frequency range which lies above and does not overlap with the lower frequency range, for coupling the assembly unit to a support structure of the vehicle in a vibration-damping way.

2. The damper system according to claim 1, wherein the respective main vibration damper has a first natural frequency in the lower frequency range, and the respective acoustic bushing has a first natural frequency in the higher frequency range.

3. The damper system according to claim 2, wherein the first natural frequency of the respective main vibration damper is a first natural frequency for a translational vibration mode of the respective main vibration damper and/or the first natural frequency of the respective acoustic bushing is a first natural frequency for a translational vibration mode of the respective acoustic bushing.

4. The damper system according to claim 1, wherein the respective main vibration damper has a global maximum dissipation of vibration energy in the lower frequency range, and the respective acoustic bushing has a global maximum dissipation of vibration energy in the higher frequency range.

5. The damper system according to claim 1, wherein the lower frequency range is up to 75 Hz or up to 50 Hz and/or the higher frequency range is above 100 Hz.

6. The damper system according to claim 1, wherein the lower frequency range is from 10 Hz to 30 Hz.

7. The damper system according to claim 1, wherein the higher frequency range is above 400 Hz.

8. The damper system according to claim 1, the respective acoustic bushing comprising:
   a. an inner core having an outer circumferential surface extending about a longitudinal axis of the acoustic bushing;
   b. an outer sleeve having an inner circumferential surface surrounding the outer circumferential surface; and
   c. an elastomer structure which surrounds the outer circumferential surface of the inner core in areal contact and is surrounded by the inner circumferential surface of the outer sleeve in areal contact and, in the areal contact, couples the inner core and the outer sleeve such that shear forces are transmitted and/or torques are transmitted with respect to the longitudinal axis.

9. The damper system according to claim 8, wherein the outer circumferential surface of the inner core and the inner circumferential surface of the outer sleeve are each noncircular in their areal contact with the elastomer structure.

10. The damper system according to claim 8, wherein the outer circumferential surface of the inner core and the inner circumferential surface of the outer sleeve are each polygonal in their areal contact with the elastomer structure.

11. The damper system according to claim 8, wherein the outer sleeve can be rotated relative to the inner core about the longitudinal axis by a lead angle against an elastic restoring force of the elastomer structure out of an initial state, in which the acoustic bushing is not subject to a load, into a rotational angular position in which the outer circumferential surface of the inner core and the inner circumferential surface of the outer sleeve are parallel and/or concentric with respect to the longitudinal axis at least in portions.

12. The damper system according to claim 8, wherein the outer sleeve can be rotated relative to the inner core about the longitudinal axis by a lead angle against an elastic restoring force of the elastomer structure out of an initial state, in which the acoustic bushing is not subject to a load, into a rotational angular position in which the outer circumferential surface of the inner core and the inner circumferential surface of the outer sleeve are parallel and/or concentric with respect to the longitudinal axis throughout their circumference.

13. The damper system according to claim 8, wherein the outer sleeve has a noncircular outer circumferential surface for joining to the support structure such that it is fixed against torquing about the longitudinal axis.

14. The damper system according to claim 8, wherein the outer sleeve has a polygonal outer circumferential surface for joining to the support structure such that it is fixed against torquing about the longitudinal axis.

15. The damper system according to claim 8, wherein the inner core has an axially extending cavity around which the outer circumferential surface of the inner core extends, wherein the cavity extends up to at least one of the facing ends of the acoustic bushing such that a fastening element for joining to the assembly unit can be inserted into the cavity.

16. The damper system according to claim 15, wherein the cavity is an axially straight passage.

17. The damper system according to claim 8, wherein an end portion of the inner core protrudes axially beyond the outer sleeve, and the protruding end portion has a facing surface for an axial pressure contact for establishing an axial press fit with the assembly unit.

18. The damper system according to claim 8, wherein the inner core, the outer sleeve and the elastomer structure each have a flange, and the flange of the elastomer structure protrudes radially outward, axially between the flange of the inner core and the flange of the outer sleeve, such that the flange of the elastomer structure can be elastically compressed axially between the flange of the inner core and the flange of the outer sleeve.

19. The damper system according to claim 8, wherein an axial end portion of the outer sleeve has a latching protrusion which protrudes radially outward, in order to axially secure the respective acoustic bushing at the installation location when it is joined to the support structure.

20. The damper system according to claim 1, wherein:
   a. the damper system comprises the support structure;
   b. the respective main vibration damper and the respective acoustic bushing are joined to the support structure; and
   c. the assembly unit is joined to the respective acoustic bushing.

21. The damper system according to claim 20, wherein the respective main vibration damper is free of the assembly unit, in order to couple the support structure to another structure of the vehicle in a vibration-damping way by means of the respective main vibration damper.

22. An acoustic bushing for coupling an assembly unit of a vehicle to a support structure in a vibration-damping way, the acoustic bushing comprising:
   a. an inner core having an outer circumferential surface which extends about a longitudinal axis of the acoustic bushing;
   b. an outer sleeve having an inner circumferential surface surrounding the outer circumferential surface; and c. an elastomer structure which surrounds the outer circumferential surface of the inner core in areal contact and is surrounded by the inner circumferential surface of the outer sleeve in areal contact and, in the areal contact, couples the inner core and the outer sleeve such that shear forces are transmitted and/or torques are transmitted with respect to the longitudinal axis, d. wherein the outer circumferential surface of the inner core and the inner circumferential surface of the outer sleeve are each noncircular in the areal contact with the elastomer structure.

23. The acoustic bushing according to claim 22, wherein the outer circumferential surface of the inner core and the inner circumferential surface of the outer sleeve are polygonal in the areal contact with the elastomer structure.

24. The acoustic bushing according to claim 22, wherein the outer sleeve can be rotated out of an initial state, in which the acoustic bushing is not subject to a load, about the longitudinal axis against an elastic restoring force of the elastomer structure relative to the inner core by a lead angle into a rotational angular position in which the outer circumferential surface of the inner core and the inner circumferential surface of the outer sleeve are parallel and/or concentric with respect to the longitudinal axis at least in portions.

25. The acoustic bushing according to claim 22, wherein the outer sleeve can be rotated out of an initial state, in which the acoustic bushing is not subject to a load, about the longitudinal axis against an elastic restoring force of the elastomer structure relative to the inner core by a lead angle into a rotational angular position in which the outer circumferential surface of the inner core and the inner circumferential surface of the outer sleeve are parallel and/or concentric with respect to the longitudinal axis throughout their circumference.

* * * * *